United States Patent [19]
Lacroix et al.

[11] Patent Number: 5,134,521
[45] Date of Patent: Jul. 28, 1992

[54] WIDE-ANGLE DISPLAY DEVICE FOR COMPACT SIMULATOR

[75] Inventors: Michel Lacroix, Bois D'Arcy; Michel Henique, Berville, both of France

[73] Assignee: Thomson-CSF, Puteaux, France

[21] Appl. No.: 708,284

[22] Filed: May 31, 1991

[30] Foreign Application Priority Data

Jun. 1, 1990 [FR] France .................. 90 06872

[51] Int. Cl.⁵ .................. G02B 27/10; G09B 9/08
[52] U.S. Cl. .................. 359/631; 359/633; 434/40; 434/44; 358/87; 358/88; 358/104
[58] Field of Search ........... 359/630, 618, 631, 632, 359/633, 462, 471, 482; 340/705; 434/40, 43, 44; 358/87, 88, 103, 104

[56] References Cited

U.S. PATENT DOCUMENTS

| | | |
|---|---|---|
| 3,923,370 | 12/1975 | Mostrom .................. 359/630 |
| 4,234,891 | 11/1980 | Beck et al. . |
| 4,347,508 | 8/1982 | Spooner .................. 434/44 |
| 4,348,185 | 9/1982 | Breglia et al. . |
| 4,348,187 | 9/1982 | Dotsko .................. 434/44 |
| 4,439,157 | 3/1984 | Breglia et al. . |
| 4,743,200 | 5/1988 | Welch et al. . |
| 4,902,116 | 2/1990 | Ellis .................. 359/630 |
| 5,035,474 | 7/1991 | Moss et al. .................. 359/630 |

FOREIGN PATENT DOCUMENTS

| | | |
|---|---|---|
| 358559 | 3/1990 | European Pat. Off. . |
| 2517916 | 6/1983 | France .................. 358/88 |
| 2039468 | 8/1980 | United Kingdom . |

OTHER PUBLICATIONS

IEEE Spectrum, vol. 22, No. 3, Mar. 1985, pp. 38–47, New York US; M. A. Fischetti et al.: "Simulating the right stuff".

*Primary Examiner*—Jon W. Henry
*Attorney, Agent, or Firm*—Oblon, Spivak, McClelland, Maier & Neustadt

[57] ABSTRACT

The disclosed display device for simulators has, for the display of a zone of interest, a visual unit fixed to a helmet, essentially constituted by mirrors and spherical screens and, for the peripheral vision, a system of wide-angle projection on a sphere.

10 Claims, 3 Drawing Sheets

WIDE-ANGLE DISPLAY DEVICE FOR COMPACT SIMULATOR

BACKGROUND OF THE INVENTION

The present invention relates to a wide-angle display device for a compact simulator.

The systems generally used to restore images in a simulator such as an aircraft simulator are systems such as CRT-based collimation systems or off-axis collimated display systems with spherical screen and mirror, in which this mirror may be a sphere with a large diameter (of several meters). Systems such as this work accurately but have a bulk and weight that are often very great, and may require a complicated infrastructure.

Besides there are known display devices using optic systems with lenses and mirror, fixed to a helmet worn by the user. These devices are generally compact and light, but their visual field is limited, and their light output is low.

An object of the present invention is a device for the display of simulated images that is simple and compact, and can be used to restore images with the widest possible field and the highest possible light output.

SUMMARY OF THE INVENTION

The wide-angle display device for compact simulators, according to the invention has, for central vision:

a device for collimation at infinity with spherical mirror and screen fixedly joined to a helmet worn by the user, associated with a remote projector connected, firstly, by optic fiber to a optic relay device fixed to the helmet and, secondly, to an image generator, the image generator being connected to a device to sense the position of the head of the helmet wearer to provide for the servo-link between the central viewing zone and the movements of the head;

and for peripheral vision:

a device for wide-angle projection at a finite distance on a spherical surface, connected to the image generator.

BRIEF DESCRIPTION OF THE DRAWINGS

The present invention shall be understood more clearly from the following detailed description of an embodiment, taken as a non-restrictive example and illustrated by the appended drawings, wherein.

DETAILED DESCRIPTION OF THE INVENTION

Figure 1:
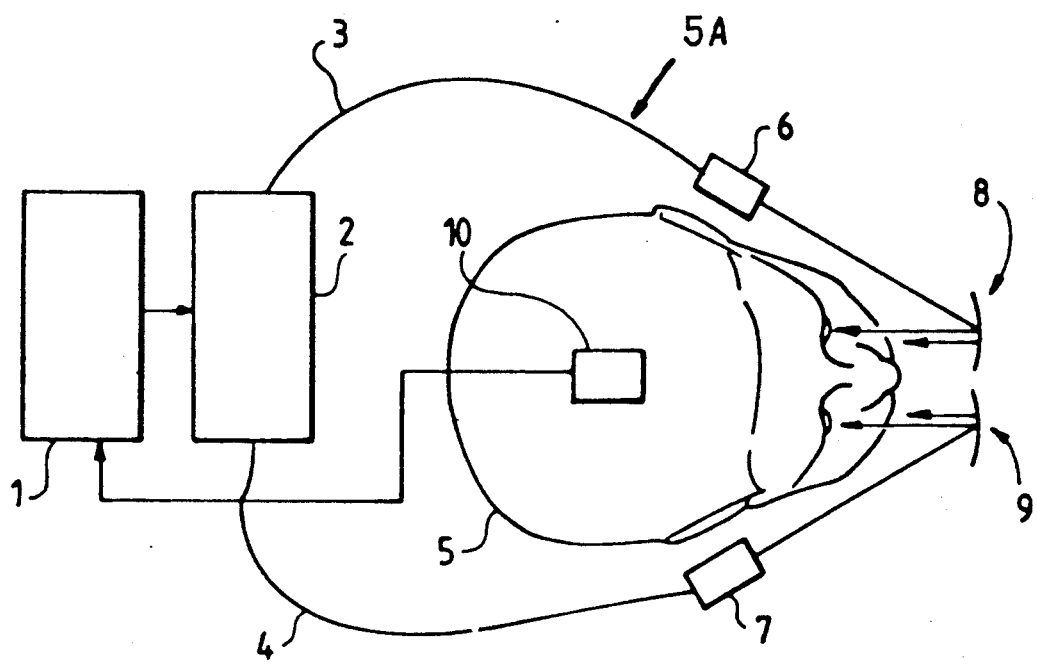
FIG. 1 is a schematic view of the part for displaying a zone of interest, of a device according to the invention.

The device for displaying a zone of interest or "helmet display" unit 5A, shown in FIG. 1, essentially has an image generator 1, a projector 2, an optic fiber 3, 4 to carry images relating to each eye of the user 5, an optic relay device 6, 7 fixed to the end of each optic fiber and a corresponding image-formation optic device 8, 9 described in greater detail here below with reference to FIGS. 2 and 3.

The elements 1 and 2 may be distant from the user, the optic fibers having the necessary length. The elements 6 to 9 are fixed appropriately to a helmet (not shown) worn by the user 5. Furthermore, a device 10, namely a sensor of the position of the user's head, of a type known per se, is fixed to this helmet. This device 10 is connected to the image generator 1 to control therein, in a manner known per se, the movements of a "window" corresponding to the zone of interest that has to be seen by the user.

Figure 2:
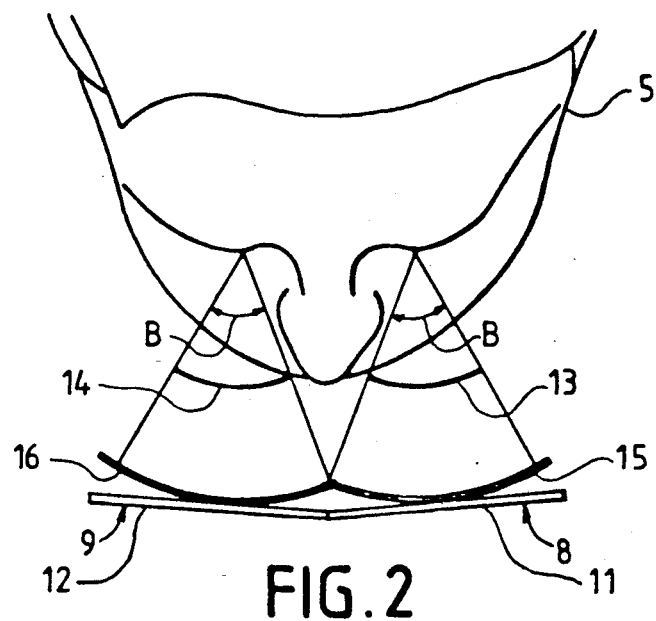
FIG. 2 is a top view of the optic part, fixedly joined to the helmet, of the device of FIG. 1.
Figure 3:
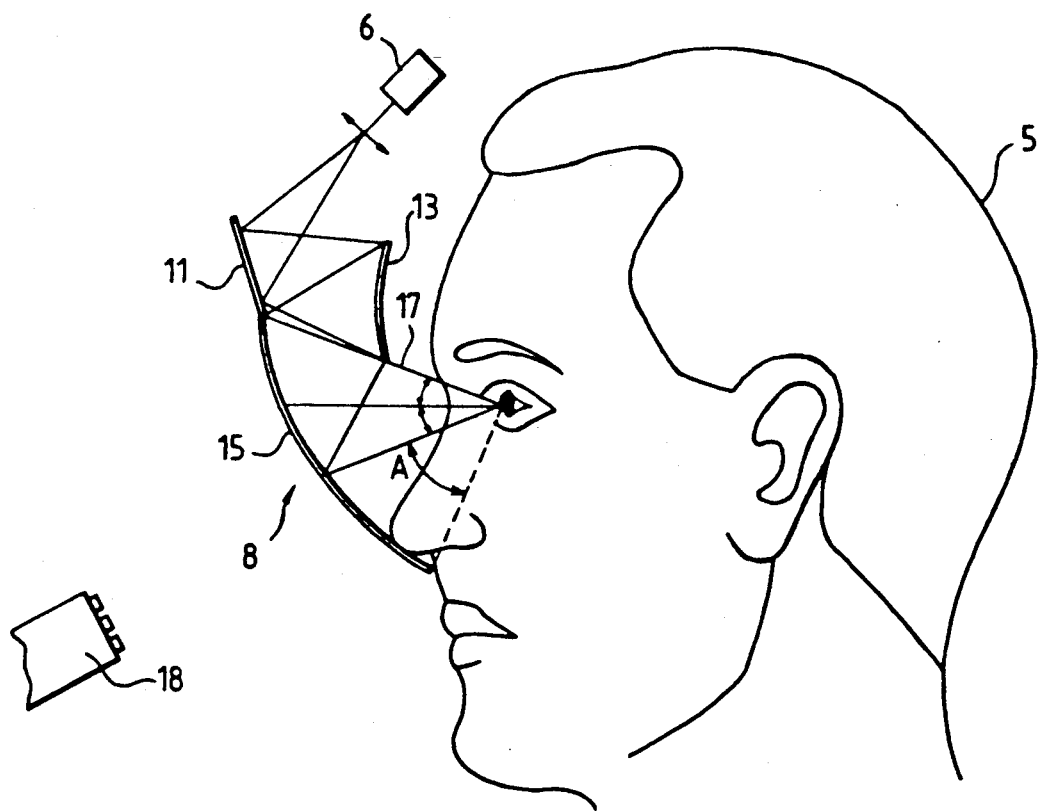
FIG. 3 is a side view of the optic part of FIG. 2.

FIGS. 2 and 3 show detailed views of the optic devices 8 and 9. These devices 8 and 9 are identical. Each of them has an image formation channel. In the present example, each channel has a horizontal field B of about 50°.

The devices 8 and 9 each have: a plane mirror (11, 12 respectively), a spherical screen (13, 14 respectively) and a spherical mirror that is at least partly semi-reflective (15, 16 respectively). The concave faces of the screens and of the spherical mirrors are pointed towards the observer. The plane mirrors and the screens are located above a horizontal plane passing through the centers of the observer's eyes, while the semi-transparent spherical mirrors 15, 16 are substantially at the level of the user's eyes. These mirrors 15, 16 are fixed at a few centimeters from the user's eyes. When the user looks straight ahead, his instantaneous, vertical visual field, which is about 40°, covers the upper part of the mirrors 15, 16, the lower part of these mirrors corresponding to a vertical field of about 40° (angle A in FIG. 3) which the user may cover by lowering his eyes. The screens 13, 14 are positioned in relation to the mirrors 15, 16 so that, when the user looks straight ahead, the upper boundary 17 of his vertical field is practically tangential to the lower edges of these screens and to the upper edges of the mirrors 15, 16 (see FIG. 3). The devices 6, 7 are devices, of a type known per se, with lenses enabling the projection, on the mirrors 11, 12, of the images conveyed by the fibers 3, 4. The images formed by the devices 6, 7 on the mirrors 11, 12 are sent on by these mirrors 11, 12 to the screens 13, 14. Thus, in looking at the mirrors 15, 16, the user 5 may see the images formed on the screens 13, 14.

Figure 4:
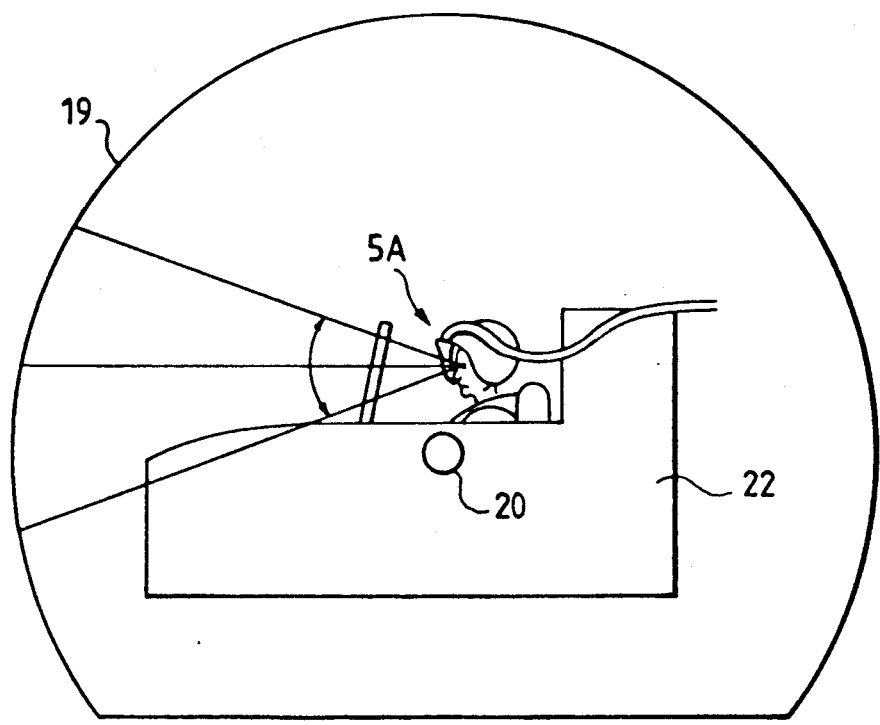
FIGS. 4 and 5 are respectively a side view and a top view of the device of the invention.
Figure 5:
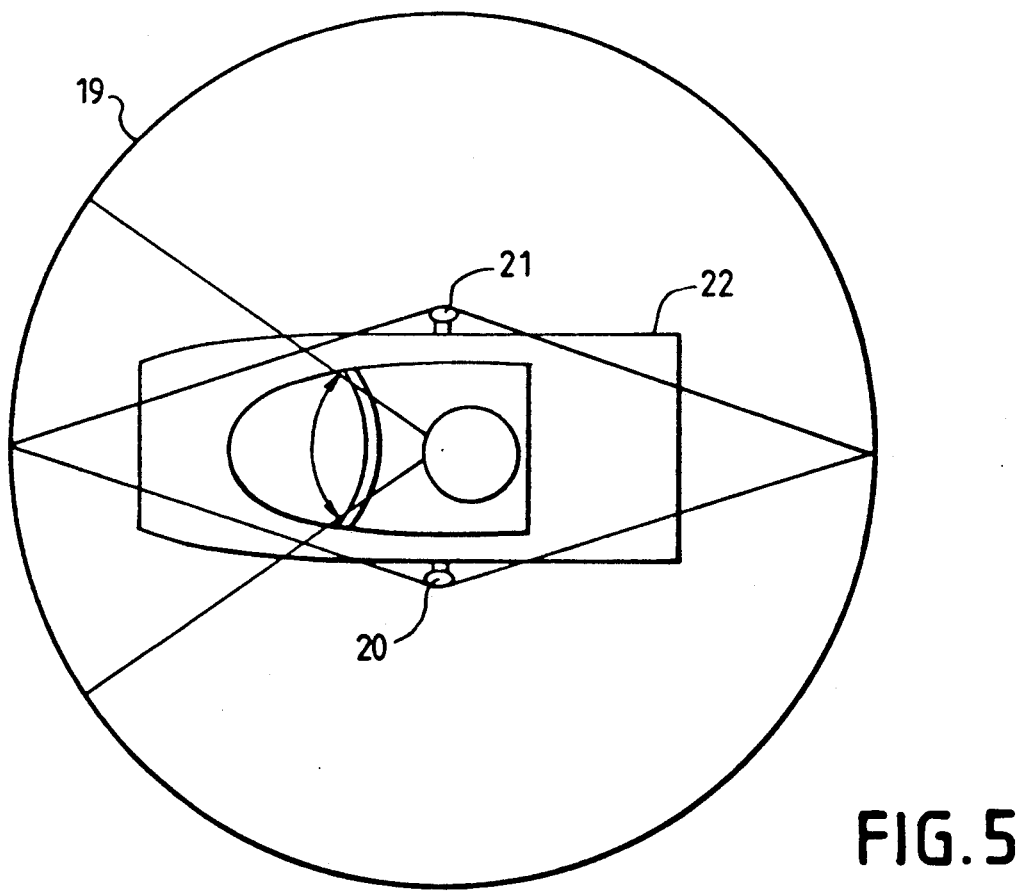

Naturally, the image generator and the projectors are made so as to provide for a perfect superimposition of the images seen by the right eye and the left eye in the zone where the visual fields of these two eyes overlap. The mirrors 15 and 16 are semi-reflective to enable the user to see the instruments of the instrument panel 18 and the sphere 19, described here below with reference to FIGS. 4 and 5, through them.

The device 10, in sensing the motions of the user's head, sends information to the image generator 1. This information can be used, in a manner known per se, to control the relative movements of the "zone of interest" seen by the user in correspondence with the movements of his head.

The sphere, or more precisely a portion of a sphere 19, on which a very wide-field image (180° to 360°) is displayed at a finite distance, has a relatively small radius (1.5 m to 2 m approximately). This sphere is made of any appropriate material, which is both as light as possible and solid, and has the best possible optic reflection coefficient. Naturally, it is possible for the basic material of the sphere not to have good qualities of optic reflection, and for it to be coated with a layer of material that is a good reflector.

The images are projected on the sphere 19 by means of two very wide-angle ("fish-eye" type) objectives 20 and 21. These objectives are preferably positioned on the sides of the user's seat 22 so that they can project an image of practically 360° on the sphere, at least in the horizontal direction. Naturally, if such a wide field does not have to be projected, it is possible to be satisfied with only one frontally positioned objective, or to use two objectives but with a smaller angle.

The images projected on the sphere relate to the peripheral vision of the user, i.e. chiefly to the space surrounding the collimated "zone of interest" which is displayed on the devices 8 and 9 and which, so to speak, gets overlaid on the wide-field image projected on the sphere.

The display device described here above gives a very big visual field: the total instantaneous field corresponds to the limits of the observer's field of vision, except for the vertical field, which is limited upwards (by the positioning of the screens 13, 14, the lower edges of which impose the limit referenced 17 in FIG. 3) to a value of about 20° (while this instantaneous vertical field is limited downwards by the limit of the observer's field of vision to about 70°). Because the mirrors 15, 16 are semi-transparent, the attenuation of the external scene (projected on the sphere 19) is only about 10% to 20%.

Figure 6:
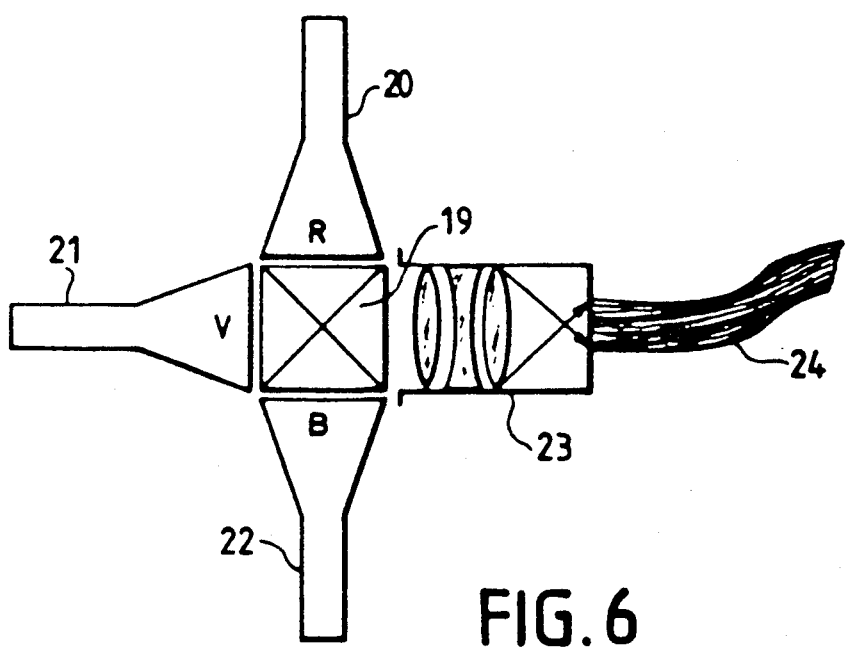
FIG. 6 is a schematic view of an embodiment of a projector that can be used in the device of FIG. 1.

FIG. 6 shows a dichroic mixer that can be used with high-brilliance tubes. This mixer has a dichroic prism 23. To three facets of this prism, there are joined high-brilliance cathode-ray tubes, 24 to 26, red, green and blue respectively. A optic device 27, for coupling with an optic fiber 28, is joined to a fourth facet of the prism 23. This mixer device is used for each of the display channels relating to each eye of the observer.

One embodiment of the invention uses a "light valve" projector or liquid crystal projector of a type that is well known per se.

If the projector used is of the type with high-brilliance tubes, the geometric distortions of the projectors and of the entire optic part of the simulator according to the invention are corrected in the projectors. It is relatively easy to make all the necessary corrections therein, especially to obtain the perfect superimposition of the images in the overlapping zone (extending, horizontally, over about 30° to 40°) of the visual fields of the right eye and of the left eye.

If the projector used is of the light valve or liquid crystal type, the geometric distortions are corrected in the image generator for it is not possible to make corrections in the projectors.

What is claimed is:

1. A wide-angle display device for compact simulators comprising, for central vision:
   a device for collimation at infinity with a spherical mirror and a spherical screen fixedly joined to a helmet worn by the user, associated with a remote projector connected, firstly, by optic fiber to an optic relay device fixed to the helmet and, secondly, to an image generator, the image generator being connected to a device to sense the position of the head of the helmet wearer to provide a servo-link between the central viewing zone and the movements of the head;
   and for peripheral vision:
   a device for wide-angle projection at a finite distance from the device, said device projecting on an additional spherical surface, and connected to the image generator.

2. A device according to claim 1, wherein the additional spherical surface is at least a portion of a sphere with a radius of 1.5 to 2 meters.

3. A device according to claim 1, wherein the device for wide-angle projection on a spherical surface has at least one "fish-eye" wide-angle objective.

4. A device according to claim 1, wherein the spherical mirror is at least partly semi-reflective.

5. A device according to claim 1, wherein the projector is a light valve projector.

6. A device according to claim 1, wherein the projector is a liquid crystal projector.

7. A device according to claim 1, wherein the projector includes high-brilliance cathode-ray tubes.

8. A device according to claim 1, wherein the correction of the geometric distortions is done in the image generator.

9. A device according to claim 1, wherein the correction of the geometric distortions is done in the projector.

10. A simulator including a wide-angle display device as set forth in claim 1.

* * * * *